US010693845B2

(12) United States Patent
Li

(10) Patent No.: US 10,693,845 B2
(45) Date of Patent: Jun. 23, 2020

(54) ENHANCING SECURITY OF APPLICATION DOWNLOADS

(71) Applicant: Alibaba Group Holding Limited, George Town (KY)

(72) Inventor: Jiajia Li, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 266 days.

(21) Appl. No.: 15/840,572

(22) Filed: Dec. 13, 2017

(65) Prior Publication Data

US 2018/0103016 A1   Apr. 12, 2018

Related U.S. Application Data

(63) Continuation of application No. PCT/CN2016/085213, filed on Jun. 8, 2016.

(30) Foreign Application Priority Data

Jun. 16, 2015 (CN) .......................... 2015 1 0334074

(51) Int. Cl.
*H04L 29/06* (2006.01)
*H04L 29/08* (2006.01)
(Continued)

(52) U.S. Cl.
CPC ............ *H04L 63/0428* (2013.01); *G06F 8/60* (2013.01); *H04L 29/06* (2013.01); *H04L 63/123* (2013.01); *H04L 67/02* (2013.01); *H04L 9/12* (2013.01)

(58) Field of Classification Search
CPC ... H04L 63/0428; H04L 29/06; H04L 63/123; H04L 67/02; G06F 8/60
(Continued)

(56) References Cited

U.S. PATENT DOCUMENTS 6,785,719 B1    8/2004 Jacobson et al.
2004/0227205 A1*  11/2004 Walmsley ............ B41J 2/04505
                                                     257/499
(Continued)

FOREIGN PATENT DOCUMENTS

CN    101610290    12/2009
CN    101951402    1/2011
(Continued)

OTHER PUBLICATIONS

Eustice, "A universal information appliance", 1999, IEEE, vol. 38, pp. 575-601 (Year: 1999).*
(Continued)

*Primary Examiner* — Alexander Lagor
*Assistant Examiner* — Gregory A Lane
(74) *Attorney, Agent, or Firm* — Fish & Richardson P.C.

(57) ABSTRACT

A computer-implemented method includes receiving download description information for an application from a network using an encrypted communications channel, wherein the download description information includes download address information specifying a network address from which application packages associated with the particular application can be retrieved; and downloading an application package associated with the particular application from the network address specified in the download address information, wherein the application package is downloaded using an unencrypted communications channel.

20 Claims, 4 Drawing Sheets

(51) Int. Cl.
*G06F 8/60* (2018.01)
*H04L 9/12* (2006.01)

(58) Field of Classification Search
USPC .......................................................... 713/162
See application file for complete search history.

(56) References Cited

U.S. PATENT DOCUMENTS

| | | | |
|---|---|---|---|
| 2010/0125733 A1* | 5/2010 | Kim .......................... | G06F 8/60 713/169 |
| 2010/0184422 A1* | 7/2010 | Ahrens ............. | H04M 1/72525 455/419 |
| 2011/0179268 A1* | 7/2011 | Strom ................... | H04L 29/069 713/156 |
| 2013/0163758 A1 | 6/2013 | Swaminathan et al. | |
| 2013/0198364 A1 | 8/2013 | Roberts | |

FOREIGN PATENT DOCUMENTS

| | | |
|---|---|---|
| CN | 103020180 | 4/2013 |
| CN | 103440281 | 12/2013 |
| CN | 103561040 | 2/2014 |
| CN | 103841272 | 6/2014 |

OTHER PUBLICATIONS

European Extended Search Report in European Application No. 16810945.2, dated Dec. 6, 2018 8 pages.
International Preliminary Report on Patentability in International Application No. PCT/CN2016/085213, dated Dec. 19, 2017, 11 pages (with English Translation).
Written Opinion in International Application No. PCT/CN2016/085213, dated Aug. 24, 2019, 7 pages (with English Translation).
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
International Search Report issued by the International Searching Authority in International Application No. PCT/CN2016/085213 dated Aug. 24, 2016; 8 pages.

* cited by examiner

ENHANCING SECURITY OF APPLICATION DOWNLOADS

CROSS REFERENCE TO RELATED APPLICATIONS

This application is a continuation of PCT Application No. PCT/CN2016/085213, filed on Jun. 8, 2016, which claims priority to Chinese Patent Application No. 201510334074.3, filed on Jun. 16, 2015, and each application is incorporated by reference in its entirety.

BACKGROUND

An application is a computer program that is developed to run in a computer operating system to complete one or more particular tasks. An application can run in a user mode, directly interacting with a user. Moreover, an application can have a visible user interface, such as a graphical user interface. The number and variety of available computing devices, including smart phones, intelligent terminals, and other computing systems, is increasing. As a result, the number of applications installed, used, and upgraded on the computing devices is constantly growing. Rapid and stable installation and upgrade of the applications is in demand.

SUMMARY

The present disclosure describes techniques for enhancing security of application downloads. The present disclosure relates to the field of network communication technologies, and in particular, to application downloading.

In an implementation, a computer-implemented method includes receiving download description information for an application from a network using an encrypted communications channel, wherein the download description information includes download address information specifying a network address from which application packages associated with the particular application can be retrieved; and downloading an application package associated with the particular application from the network address specified in the download address information, wherein the application package is downloaded using an unencrypted communications channel.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented in particular implementations, so as to realize one or more of the following advantages. First, using an HTTPS (Hypertext Transfer Protocol over Secure Socket Layer) channel only to download the download address information of an application can improve security without significantly increasing the data traffic required for downloading the application. Second, using the HTTPS channel in this way can result in fewer overall downloads.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

Figure 1:
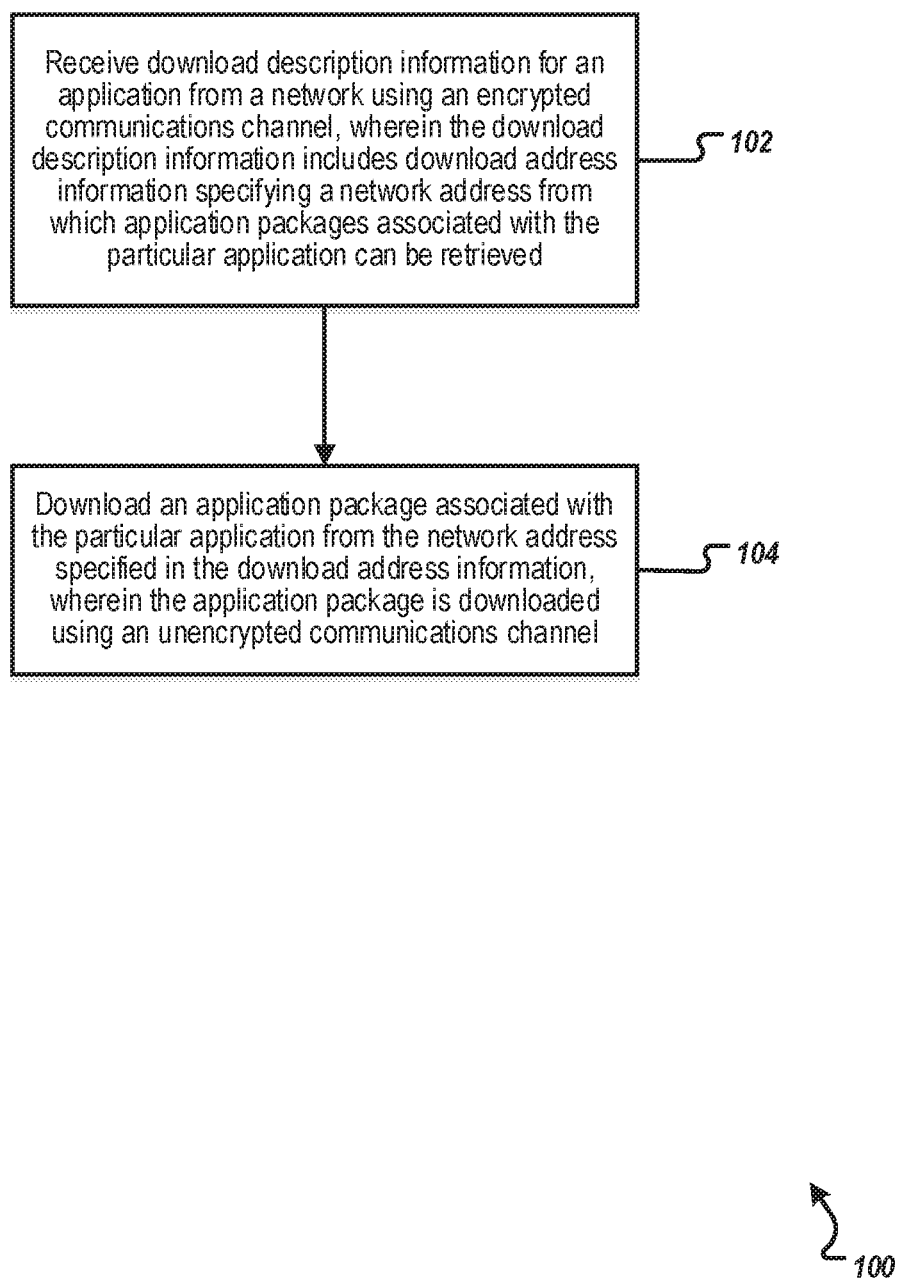
FIG. 1 is a flowchart illustrating an example of a computer-implemented method for enhancing security of application downloads, according to an implementation of the present disclosure.

The following detailed description describes techniques for downloading applications, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

An application is a computer program that is developed to run in a computer operating system to complete one or more particular tasks. An application can run in a user mode, directly interacting with a user. Moreover, an application can have a visible user interface, such as a graphical user interface. The number and variety of available computing devices, including smart phones, intelligent terminals, and other computing systems, is increasing. As a result, the number of applications installed, used, and upgraded on the computing devices is constantly growing. Rapid and stable installation and upgrade of the applications is in demand.

In conventional systems, after an instruction is received from a user for installing a new application or upgrading an old application, an application package corresponding to the instruction is downloaded (for example, by using an HTTP (Hypertext Transfer Protocol) channel). The new application can be installed, or the old application can be upgraded, using the downloaded application package. However, data transmission based on an HTTP channel can be insecure on some networks, and a malicious person may tamper with data in the HTTP channel, thus affecting the stability and security of application downloading. For example, although an instruction may be intend to download Application A, data tampering could cause installation of Application B instead.

In the present disclosure, the download address information of an application can be downloaded first by using an HTTPS (Hypertext Transfer Protocol over Secure Socket Layer) channel. After the HTTPS channel is used to receive the download address information of the application, a first application package corresponding to the download address information is downloaded by using the HTTP channel. The HTTPS channel has higher security than the HTTP channel. In comparison with conventional solutions in which the download address information of the application is downloaded by using the HTTP channel, implementations of the present disclosure can reduce the probability of tampering with the download address information. This can enhance the security of the download address information, thus enhancing the accuracy of the locally-downloaded first application package.

Because the download address information of the application only needs to occupy a small amount of computer memory (for example, a few bytes), encrypted download address information has little influence on the length of a data transmission, and an encryption process for the download address information has little influence on overall time consumption. Using the HTTPS channel to download the download address information of the application does not significantly increase data traffic required for downloading the application. Moreover, using the HTTPS channel can result in fewer overall downloads and can reduce data traffic. This solution can be preferable to conventional techniques in which downloading is continuously repeated until verification succeeds.

An HTTPS channel is a security-targeted (secure) HTTP channel=. An SSL (Secure Socket Layer) can be added to the HTTP channel, producing an HTTPS channel. The HTTPS channel can use the SSL as a secure basis, including completion of encryption and decryption operations.

During data transmission while using the HTTPS channel, because original data needs to be encrypted in the HTTPS channel, the encrypted data has a larger size than the original data. Further, an encryption process of the original data consumes time. Also, establishing an HTTPS channel typically includes exchanging certificates, tokens, or other data. Therefore, compared to the use of an HTTP channel, using an HTTPS channel is advantageous for security purposes, but is disadvantageous to a certain extent with respect to the size of the transmitted data and time consumption.

FIG. 1 is a flowchart illustrating an example of a computer-implemented method 100 for enhancing security of application downloads, according to an implementation of the present disclosure. For example, method 100 includes an application download that includes verification and another download. For clarity of presentation, the description that follows generally describes method 100 in the context of the other figures in this description. However, it will be understood that method 100 can be performed, for example, by any system, environment, software, and hardware, or a combination of systems, environments, software, and hardware, as appropriate. In some implementations, various steps of method 100 can be run in parallel, in combination, in loops, or in any order.

At 102, download description information for an application is received from a network using an encrypted communications channel. The download description information includes download address information specifying a network address from which application packages associated with the particular application can be retrieved. For example, the download description information of the application can be downloaded by using an HTTPS channel. In some implementations, downloading can be initiated or triggered when the user provides a download instruction (for example, when the user clicks a download button of an application A in an application downloading tool). Downloading can also be triggered in other ways, such as the result of other user actions. From 102, method 100 proceeds to 104.

At 104, an application package associated with the particular application is downloaded from the network address specified in the download address information. The application package is downloaded using an unencrypted communications channel. For example, the first application package corresponding to the download address information can be downloaded by using an HTTP channel. After 104, method 100 stops.

In some implementations, method 100 can be applied to various application downloading tools having an application downloading function, such as an application market and a mobile phone management assistant. For example, a user can use an application downloading tool to download an application. The application downloading tool can include an installation package, an upgrade package, or the like.

In some implementations, method 100 can include locally storing the download description information of the application corresponding to the download condition and locally reading, in response to the download instruction of the user, the download description information of the application corresponding to the download instruction. In some implementations, the local storage can occur before the application package is downloaded at step 102. Then, at step 102, downloading the first application package corresponding to the download address information by using an HTTP channel can include downloading the first application package corresponding to the read download address information by using the HTTP channel. In some implementations, when the download instruction is received from the user, the pre-stored download description information of the application corresponding to the download instruction may be directly read locally, thus enhancing the response and download efficiency for the download instruction.

In some implementations, the download condition may specifically include one or more conditions that are to exist before downloading occurs, including: 1) when an application downloading tool is enabled, 2) when an application is enabled, and 3) when a synchronization request from a server is received.

In some implementations, when the download condition is enabled, the application corresponding to the download condition can include a pre-configured application that includes at least one of a popular application and a user-configured application. The popular application can be, for example, one of various applications that are the most frequently searched, downloaded, installed, or recommended by the user within a recent time period. The user-configured application can indicate an application obtained through an interface configuration of the application downloading tool. When the application downloading tool is enabled, a client terminal of the application downloading tool can send a first download request including information about the pre-configured application to a server terminal. The request can be to download, or receive, download description information of the pre-configured application by using the HTTPS channel. The downloaded download description information of the pre-configured application is then stored locally. Because the user has not triggered a download instruction when the application downloading tool is enabled, in this case, upon receiving the download instruction from the user, the pre-stored download description information of the application corresponding to the download instruction may be directly read locally. This can enhance the response efficiency and download efficiency for the download instruction.

In another example, when the download condition specifies that an application is to be enabled, the application corresponding to the download condition can include an enable application, or an application associated with the enable application.

In this way, applications that associate with each other can automatically be handled in the same way. Application associations can include, for example, applications of the same type, applications that are developed jointly or by the same developer(s), and applications that are related to a same process. For example, a WECHAT app (application) and a QQ app are developed by the same developer, and therefore have an association. In another example, FIGHT THE LANDLORD app and a TRACTOR app may both be categorized as being related to chess games, and thus the LANDLORD and TRACTOR apps have an association. In another example, an association can exist between a shopping app and a payment app that is used by the shopping app, such as JINGDONG and ALIPAY apps that have an association.

In another example, when the download condition specifies that a synchronization request from a server is to be received, the application corresponding to the download condition can include an application corresponding to the synchronization request. In some implementations, when a new application uploaded or updated by a developer is detected, the server can send the synchronization request to a client terminal. The synchronization request can include information about the new or updated application, so that the client terminal can download the download description information of the application corresponding to the synchronization request by using the HTTPS channel.

Downloading the first application package provides advantages of a reduction in data transmission length, time consumption of the HTTP channel, and traffic required for downloading the application. However, the first download can fail, such as if the data is maliciously compromised or diverted. When verification indicates that a failure has occurred during the first download, indicating that the download of the first application package has failed, a second application package can be downloaded using the HTTPS channel, providing higher security. Limiting download attempts to two attempts can be preferred over conventional solutions in which an application package may be downloaded many times using the HTTP channel.

For example, suppose that an application designated by a user to be downloaded is Application A. In a conventional solution, a download address of Application B and download verification information of Application C are probably downloaded by using an HTTP channel. If an error exists in the download address, the probability of downloading to obtain the application A is low. If the download verification information (Application C) does not match the download address information (Application B), then a success probability of verification is excessively low, thus greatly increasing the number of times of repeating download attempts. Repetition of download attempts is a goal of the present disclosure.

In some implementations, in addition to a download address of the application A, download verification information of the application A can also be downloaded by using the HTTPS channel. The verification information can be used to improve the accuracy of a locally-downloaded application package of the application A. Further, the success probability of verification can also be enhanced, thus greatly reducing the number of times of re-attempting the download, for example, until verification succeeds.

In some implementations, before an application is downloaded, download description information of the application can be acquired from the server first by using the HTTPS channel. The download description information can include download verification information such as a URL (Uniform Resource Locator) of the application, abstract information of the application, and signature information of the application.

Then, a first application package corresponding to the URL can be downloaded by using the HTTP channel. After the downloading is finished, an abstract operation can be performed on the locally downloaded first application package according to an abstract algorithm such as an MD5 (Message Digest Algorithm 5), or a signature operation is performed on the first application package and by using a signature algorithm. Afterwards, a result of the abstract operation can be compared with the abstract information of the application in the download description information. In another example, a result of the signature operation can be compared with the signature information of the application in the download description information. A comparison result that indicates that the abstract information is consistent also indicates that the verification has succeeded. However, if the comparison result indicates that the abstract information is inconsistent, then that is an indication that the verification has failed.

Figure 2:
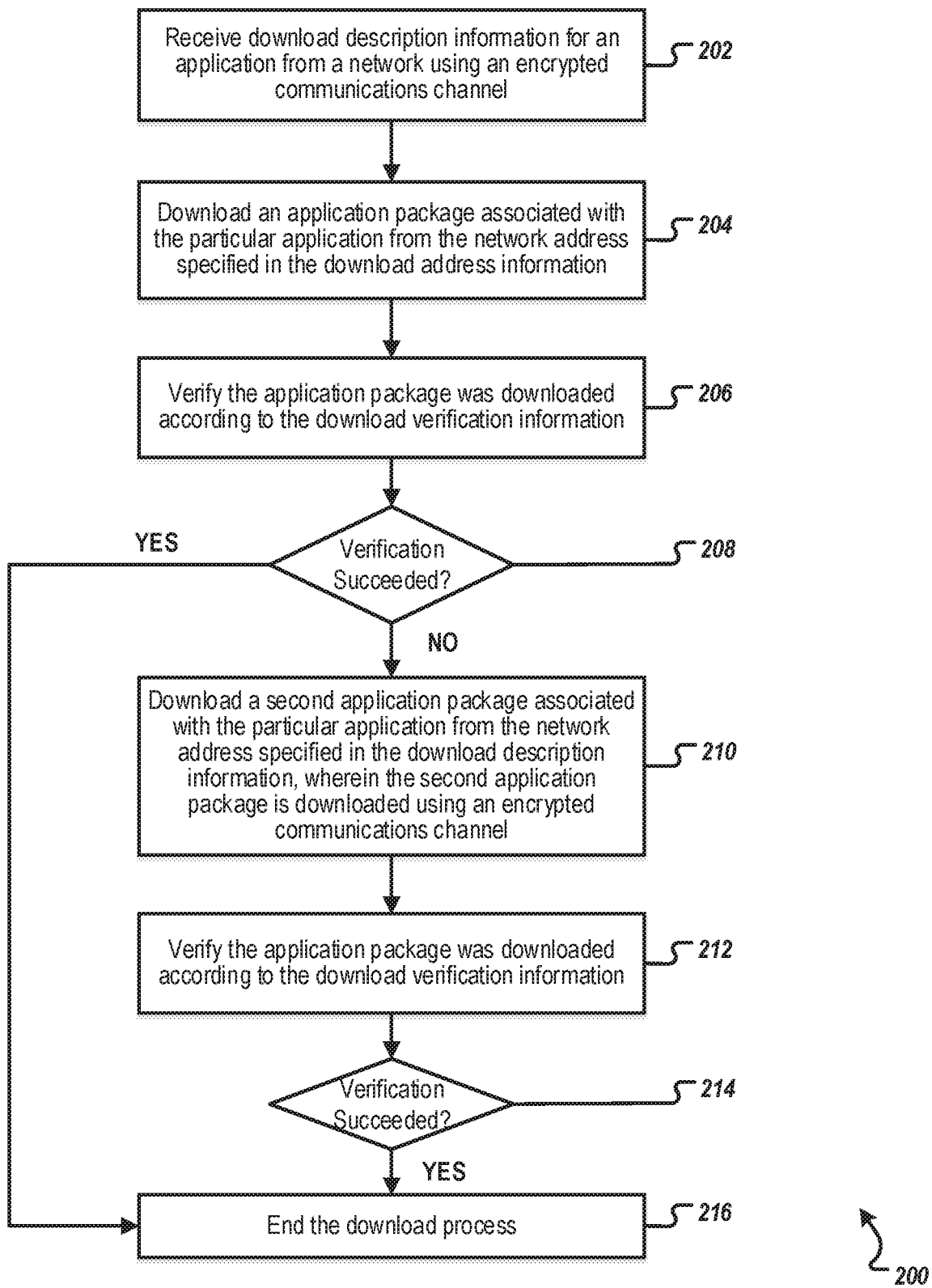
FIG. 2 is a flowchart illustrating an example of a computer-implemented method for enhancing security of application downloads, according to an implementation of the present disclosure.

FIG. 2 is a flowchart illustrating an example of a computer-implemented method 200 for enhancing security of application downloads, according to an implementation of the present disclosure. For example, method 200 includes an application download that includes verification and another download. For clarity of presentation, the description that follows generally describes method 200 in the context of the other figures in this description. However, it will be understood that method 200 can be performed, for example, by any system, environment, software, and hardware, or a combination of systems, environments, software, and hardware, as appropriate. In some implementations, various steps of method 200 can be run in parallel, in combination, in loops, or in any order.

At 202, download description information for an application is received from a network using an encrypted communications channel. The download description information includes download address information specifying a network address from which application packages associated with the particular application can be retrieved. For example, the download description information of the application can be downloaded by using an HTTPS channel. In some implementations, downloading can be initiated or triggered when the user provides a download instruction, for example, when the user clicks a download button of an application A in an application downloading tool. Downloading can be triggered in other ways, such as the result of other user actions. From 202, method 200 proceeds to 204.

At 204, an application package associated with the particular application is downloaded from the network address specified in the download address information. The application package is downloaded using an unencrypted communications channel. For example, the first application package corresponding to the download address information can be downloaded by using an HTTP channel. From 204, method 200 proceeds to 206.

At 206, after downloading the application package, the download of the application package is verified according to the download verification information. This can occur because the download description information can include download verification information. From 206, method 200 proceeds to 208.

At 208, a determination is made as to whether verification has succeeded. From 208, method 200 proceeds to 210.

At 210, if verification did not succeed at 208, a second application package associated with the particular application is downloaded from the network address specified in the download description information. The second application package is downloaded using an encrypted communications channel, for example, HTTPS. From 210, method 200 proceeds to 212.

At 212, after downloading the second application package, the download of the second application package is verified according to the download verification information. From 212, method 200 proceeds to 214.

At 214, a determination is made as to whether verification of the second download has succeeded. The process of verifying the locally downloaded second application package according to the download verification information is similar to the verification process in step 208. In some implementations, if verification of the second download indicates a failure, step 210 can be repeatedly performed until verification succeeds. From 214, method 200 proceeds to 216.

At 216, if the verification succeeded after either of steps 208 or 214, the download process is ended. After 216, method 200 stops.

Figure 3:
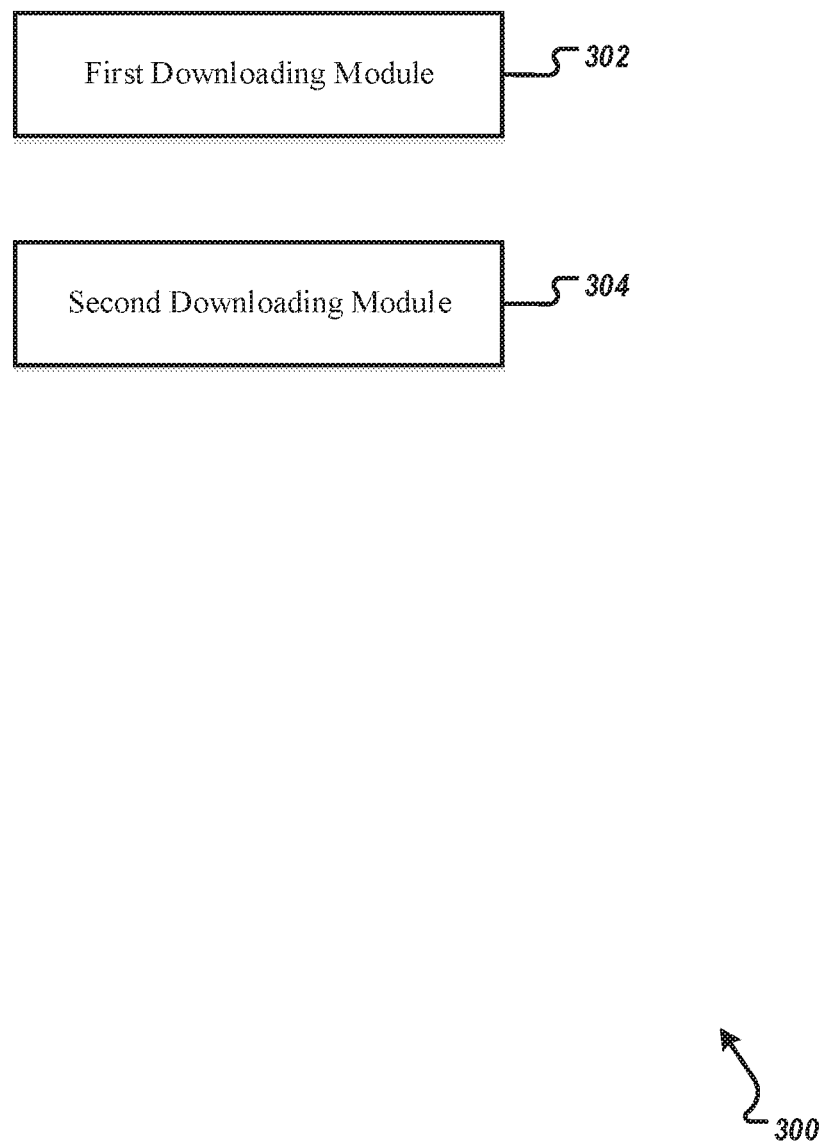
FIG. 3 is a structural block diagram of a download application, according to an implementation of the present disclosure.

FIG. 3 is a structural block diagram of a download application 300, according to an implementation of the present disclosure. In some implementations, the download application 300 can perform operations of methods 100 and 200.

A first downloading module 302 is configured to receive download description information for an application from a network using an encrypted communications channel, such as HTTPS. The download description information includes download address information specifying a network address from which application packages associated with the particular application can be retrieved.

A second downloading module 304 configured to download an application package associated with the particular application from the network address specified in the download address information. The application package is downloaded using an unencrypted communications channel such as HTTP.

In some implementations, the download description information may further include download verification information, and the download application 300 can also include a first verification module configured to verify the locally downloaded first application package according to the download verification information.

In some implementations, the download application 300 can also include a third downloading module configured to download a second application package corresponding to the download address information by using the HTTPS channel when the verification fails.

In some implementations, the first downloading module 302 may further include sub-modules. A fourth downloading sub-module is configured to download, in response to a download instruction of a user, the download description information of an application corresponding to the download instruction by using the HTTPS channel. A fifth downloading sub-module is configured to download, when a download condition is met, the download description information of an application corresponding to the download condition by using the HTTPS channel.

In some implementations, the download application 300 can also include additional modules. A storage module can be configured to locally store the download description information of the application corresponding to the download condition before the second downloading module 304 downloads the first application package corresponding to the download address information by using the HTTP channel. A reading module can be configured to locally read, in response to the download instruction of the user, the download description information of the application corresponding to the download instruction. The second downloading module 304 can be specifically configured to download the first application package corresponding to the read download address information by using the HTTP channel.

In some implementations, the download condition may specifically include one or more of the following conditions: when an application downloading tool is enabled, when an application is enabled, and when a synchronization request from a server is received.

In some implementations, when the download condition may be that the application downloading tool is enabled, the application corresponding to the download condition may specifically include a pre-configured application, wherein the pre-configured application may further include at least one of a popular application and a user-configured application.

Figure 4:
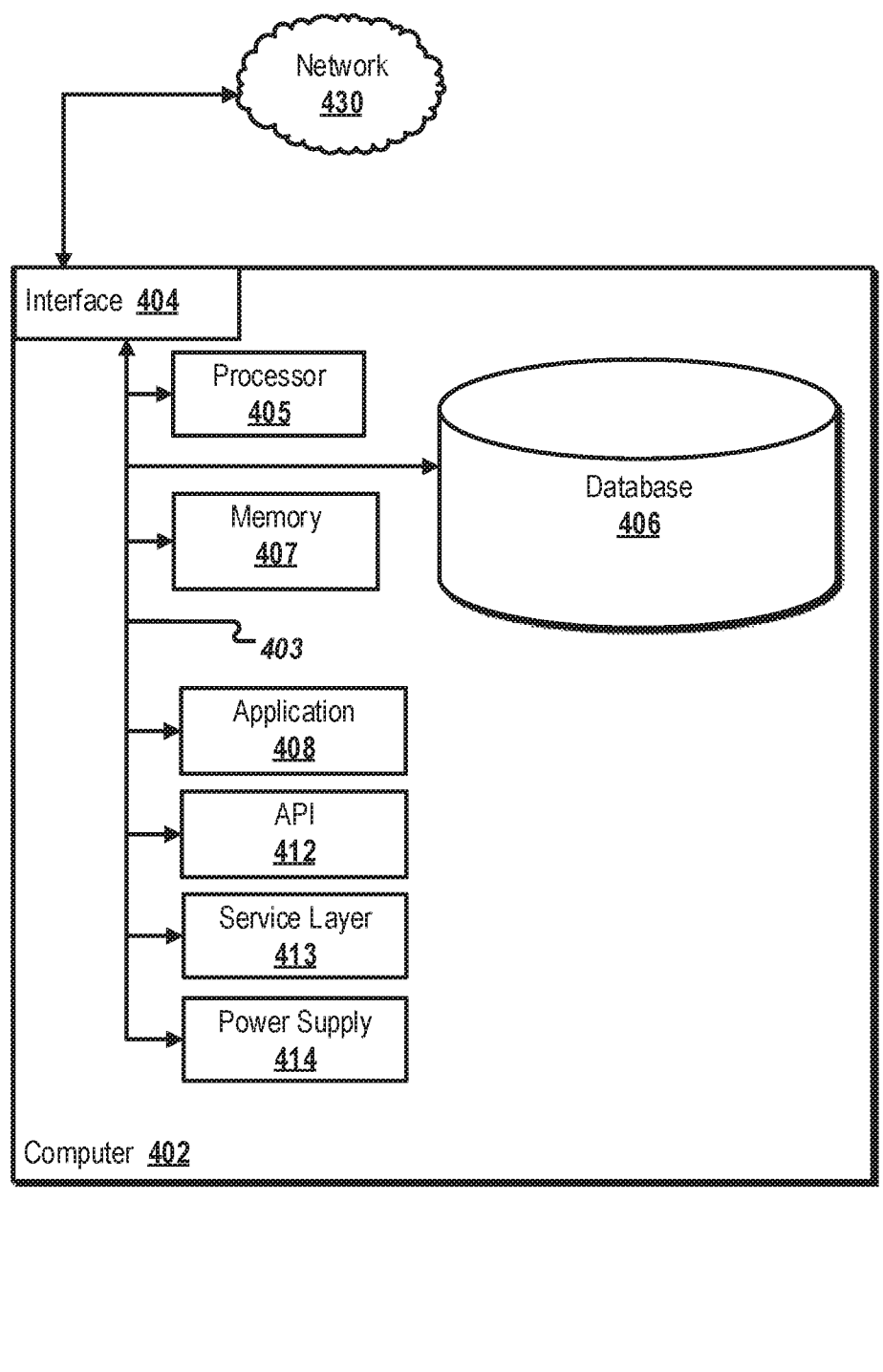
FIG. 4 is a block diagram illustrating an example of a computer-implemented system used to provide computational functionalities associated with described algorithms, methods, functions, processes, flows, and procedures, according to an implementation of the present disclosure.

FIG. 4 is a block diagram illustrating an example of a computer-implemented System 400 used to provide computational functionalities associated with described algorithms, methods, functions, processes, flows, and procedures, according to an implementation of the present disclosure. In the illustrated implementation, System 400 includes a Computer 402 and a Network 430.

The illustrated Computer 402 is intended to encompass any computing device such as a server, desktop computer, laptop/notebook computer, wireless data port, smart phone, personal data assistant (PDA), tablet computer, one or more processors within these devices, another computing device, or a combination of computing devices, including physical or virtual instances of the computing device, or a combination of physical or virtual instances of the computing device. Additionally, the Computer 402 can include an input device, such as a keypad, keyboard, touch screen, another input device, or a combination of input devices that can accept user information, and an output device that conveys information associated with the operation of the Computer 402, including digital data, visual, audio, another type of information, or a combination of types of information, on a graphical-type user interface (UI) (or GUI) or other UI.

The Computer 402 can serve in a role in a distributed computing system as a client, network component, a server, a database or another persistency, another role, or a combination of roles for performing the subject matter described in the present disclosure. The illustrated Computer 402 is communicably coupled with a Network 430. In some implementations, one or more components of the Computer 402 can be configured to operate within an environment, including cloud-computing-based, local, global, another environment, or a combination of environments.

At a high level, the Computer 402 is an electronic computing device operable to receive, transmit, process, store, or manage data and information associated with the described subject matter. According to some implementations, the Computer 402 can also include or be communicably coupled with a server, including an application server, e-mail server, web server, caching server, streaming data server, another server, or a combination of servers.

The Computer 402 can receive requests over Network 430 (for example, from a client software application executing on another Computer 402) and respond to the received requests by processing the received requests using a software application or a combination of software applications. In addition, requests can also be sent to the Computer 402 from internal users (for example, from a command console or by another internal access method), external or third-parties, or other entities, individuals, systems, or computers.

Each of the components of the Computer 402 can communicate using a System Bus 403. In some implementations, any or all of the components of the Computer 402, including hardware, software, or a combination of hardware and software, can interface over the System Bus 403 using an application programming interface (API) 412, a Service Layer 413, or a combination of the API 412 and Service Layer 413. The API 412 can include specifications for routines, data structures, and object classes. The API 412 can be either computer-language independent or dependent and refer to a complete interface, a single function, or even a set of APIs. The Service Layer 413 provides software services to the Computer 402 or other components (whether illustrated or not) that are communicably coupled to the Computer 402. The functionality of the Computer 402 can be accessible for all service consumers using the Service Layer 413. Software services, such as those provided by the Service Layer 413, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the Computer 402, alternative implementations can illustrate the API 412 or the Service Layer 413 as stand-alone components in relation to other components of the Computer 402 or other components (whether illustrated or not) that are communicably coupled to the Computer 402. Moreover, any or all parts of the API 412 or the Service Layer 413 can be implemented as a child or a sub-module of another software module, enterprise application, or hardware module without departing from the scope of the present disclosure.

The Computer 402 includes an Interface 404. Although illustrated as a single Interface 404, two or more Interfaces 404 can be used according to particular needs, desires, or particular implementations of the Computer 402. The Interface 404 is used by the Computer 402 for communicating with another computing system (whether illustrated or not) that is communicatively linked to the Network 430 in a distributed environment. Generally, the Interface 404 is operable to communicate with the Network 430 and includes logic encoded in software, hardware, or a combination of software and hardware. More specifically, the Interface 404 can include software supporting one or more communication protocols associated with communications such that the Network 430 or hardware of Interface 404 is operable to communicate physical signals within and outside of the illustrated Computer 402.

The Computer 402 includes a Processor 405. Although illustrated as a single Processor 405, two or more Processors 405 can be used according to particular needs, desires, or particular implementations of the Computer 402. Generally, the Processor 405 executes instructions and manipulates data to perform the operations of the Computer 402 and any algorithms, methods, functions, processes, flows, and procedures as described in the present disclosure.

The Computer 402 also includes a Database 406 that can hold data for the Computer 402, another component communicatively linked to the Network 430 (whether illustrated or not), or a combination of the Computer 402 and another component. For example, Database 406 can be an in-memory, conventional, or another type of database storing data consistent with the present disclosure. In some implementations, Database 406 can be a combination of two or more different database types (for example, a hybrid in-memory and conventional database) according to particular needs, desires, or particular implementations of the Computer 402 and the described functionality. Although illustrated as a single Database 406, two or more databases of similar or differing types can be used according to particular needs, desires, or particular implementations of the Computer 402 and the described functionality. While Database 406 is illustrated as an integral component of the Computer 402, in alternative implementations, Database 406 can be external to the Computer 402.

The Computer 402 also includes a Memory 407 that can hold data for the Computer 402, another component or components communicatively linked to the Network 430 (whether illustrated or not), or a combination of the Computer 402 and another component. Memory 407 can store any data consistent with the present disclosure. In some implementations, Memory 407 can be a combination of two or more different types of memory (for example, a combination of semiconductor and magnetic storage) according to particular needs, desires, or particular implementations of the Computer 402 and the described functionality. Although illustrated as a single Memory 407, two or more Memories 407 or similar or differing types can be used according to particular needs, desires, or particular implementations of the Computer 402 and the described functionality. While Memory 407 is illustrated as an integral component of the Computer 402, in alternative implementations, Memory 407 can be external to the Computer 402.

The Application 408 is an algorithmic software engine providing functionality according to particular needs, desires, or particular implementations of the Computer 402, particularly with respect to functionality described in the present disclosure. For example, Application 408 can serve as one or more components, modules, or applications. Further, although illustrated as a single Application 408, the Application 408 can be implemented as multiple Applications 408 on the Computer 402. In addition, although illustrated as integral to the Computer 402, in alternative implementations, the Application 408 can be external to the Computer 402.

The Computer 402 can also include a Power Supply 414. The Power Supply 414 can include a rechargeable or non-rechargeable battery that can be configured to be either user- or non-user-replaceable. In some implementations, the Power Supply 414 can include power-conversion or management circuits (including recharging, standby, or another power management functionality). In some implementations, the Power Supply 414 can include a power plug to allow the Computer 402 to be plugged into a wall socket or another power source to, for example, power the Computer 402 or recharge a rechargeable battery.

There can be any number of Computers 402 associated with, or external to, a computer system containing Computer 402, each Computer 402 communicating over Network 430. Further, the term "client," "user," or other appropriate terminology can be used interchangeably, as appropriate, without departing from the scope of the present disclosure. Moreover, the present disclosure contemplates that many users can use one Computer 402, or that one user can use multiple computers 402.

Described implementations of the subject matter can include one or more features, alone or in combination.

For example, in a first implementation, a computer-implemented method comprising: receiving download description information for an application from a network using an encrypted communications channel, wherein the download description information includes download address information specifying a network address from which application packages associated with the particular application can be retrieved; and downloading an application package associated with the particular application from the network address specified in the download address information, wherein the application package is downloaded using an unencrypted communications channel.

The foregoing and other described implementations can each, optionally, include one or more of the following features:

A first feature, combinable with any of the following features, the download description information includes download verification information, and wherein the computer-implemented method further comprises: after downloading the application package, verifying the application package according to the download verification information.

A second feature, combinable with any of the previous or following features, the application package is a first application package, and wherein the computer-implemented method further comprises: determining that the verification of the first application package has failed; and in response to determining that the verification of the first application package has failed, downloading a second application package associated with the particular application from the network address specified in the download description information, wherein the second application package is downloaded using an encrypted communications channel.

A third feature, combinable with any of the previous or following features, receiving the download description information includes retrieving the download description information in response to an instruction from a user of an application corresponding to the download instruction by using a secure channel.

A fourth feature, combinable with any of the previous or following features, the computer-implemented method further comprising: locally storing the download description information of the application corresponding to a download condition; and when the download condition is met, downloading the application package associated with the particular application from a network address specified in the locally-stored download address information, wherein the application package is downloaded using an unencrypted communications channel.

A fifth feature, combinable with any of the previous or following features, wherein the download condition includes one or more of: an application downloading tool being enabled, an application being enabled, or a synchronization request from a server being received.

A sixth feature, combinable with any of the previous or following features, the application comprises a pre-configured application, and wherein the pre-configured application comprises at least one of a popular application and a user-configured application.

In a second implementation, a non-transitory, computer-readable medium storing one or more instructions executable by a computer system to perform operations comprising: receiving download description information for an application from a network using an encrypted communications channel, wherein the download description information includes download address information specifying a network address from which application packages associated with the particular application can be retrieved; and downloading an application package associated with the particular application from the network address specified in the download address information, wherein the application package is downloaded using an unencrypted communications channel.

The foregoing and other described implementations can each, optionally, include one or more of the following features:

A first feature, combinable with any of the following features, the download description information includes download verification information, and wherein the operations further comprise: after downloading the application package, verifying the application package according to the download verification information.

A second feature, combinable with any of the previous or following features, the application package is a first application package, and wherein the operations further comprise: determining that the verification of the first application package has failed; and in response to determining that the verification of the first application package has failed, downloading a second application package associated with the particular application from the network address specified in the download description information, wherein the second application package is downloaded using an encrypted communications channel.

A third feature, combinable with any of the previous or following features, receiving the download description information includes retrieving the download description information in response to an instruction from a user of an application corresponding to the download instruction by using a secure channel.

A fourth feature, combinable with any of the previous or following features, the operations further comprising: locally storing the download description information of the application corresponding to a download condition; and when the download condition is met, downloading the application package associated with the particular application from a network address specified in the locally-stored download address information, wherein the application package is downloaded using an unencrypted communications channel.

A fifth feature, combinable with any of the previous or following features, wherein the download condition includes one or more of: an application downloading tool being enabled, an application being enabled, or a synchronization request from a server being received.

A sixth feature, combinable with any of the previous or following features, the application comprises a pre-configured application, and wherein the pre-configured application comprises at least one of a popular application and a user-configured application.

In a third implementation, a computer-implemented system, comprising: one or more computers; and one or more computer memory devices interoperably coupled with the one or more computers and having tangible, non-transitory, machine-readable media storing one or more instructions that, when executed by the one or more computers, perform one or more operations comprising: receiving download description information for an application from a network using an encrypted communications channel, wherein the download description information includes download address information specifying a network address from which application packages associated with the particular application can be retrieved; and downloading an application package associated with the particular application from the network address specified in the download address information, wherein the application package is downloaded using an unencrypted communications channel.

The foregoing and other described implementations can each, optionally, include one or more of the following features:

A first feature, combinable with any of the following features, the download description information includes download verification information, and wherein the operations further comprise: after downloading the application package, verifying the application package according to the download verification information.

A second feature, combinable with any of the previous or following features, the application package is a first application package, and wherein the operations further comprise: determining that the verification of the first application package has failed; and in response to determining that the verification of the first application package has failed, downloading a second application package associated with the particular application from the network address specified in the download description information, wherein the second application package is downloaded using an encrypted communications channel.

A third feature, combinable with any of the previous or following features, receiving the download description information includes retrieving the download description information in response to an instruction from a user of an application corresponding to the download instruction by using a secure channel.

A fourth feature, combinable with any of the previous or following features, the operations further comprising: locally storing the download description information of the application corresponding to a download condition; and when the download condition is met, downloading the application package associated with the particular application from a network address specified in the locally-stored download address information, wherein the application package is downloaded using an unencrypted communications channel.

A fifth feature, combinable with any of the previous or following features, wherein the download condition includes one or more of: an application downloading tool being enabled, an application being enabled, or a synchronization request from a server being received.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special purpose logic circuitry, for example, a central processing unit (CPU), an FPGA (field programmable gate array), or an ASIC (application-specific integrated circuit). In some implementations, the computer or computer-implemented system or special purpose logic circuitry (or a combination of the computer or computer-implemented system and special purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/-R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method comprising:
    receiving download description information for a particular application from a network using an encrypted communications channel, wherein the download description information includes download address information specifying a network address from which application packages associated with the particular application can be retrieved;
    based on the download description information, opening an unencrypted and unencoded communications channel to the specified network address; and
    downloading an application package associated with the particular application from the network address specified in the download address information, wherein the application package is downloaded using the unencrypted and unencoded communications channel.

2. The computer-implemented method of claim 1, wherein the download description information includes download verification information, and wherein the computer-implemented method further comprises:
    after downloading the application package, verifying the application package according to the download verification information.

3. The computer-implemented method of claim 2, wherein the application package is a first application package, and wherein the computer-implemented method further comprises:
    determining that the verification of the first application package has failed; and
    in response to determining that the verification of the first application package has failed, downloading a second application package associated with the particular application from the network address specified in the download description information, wherein the second application package is downloaded using an encrypted communications channel.

4. The computer-implemented method of claim 1, wherein receiving the download description information includes retrieving the download description information in response to a download instruction from a user of an application corresponding to the download instruction by using a secure channel.

5. The computer-implemented method of claim 4, further comprising:
    locally storing the download description information of the application corresponding to a download condition; and
    when the download condition is met, downloading the application package associated with the particular application from a network address specified in the locally-stored download address information, wherein the application package is downloaded using an unencrypted and unencoded communications channel.

6. The computer-implemented method of claim 5, wherein the download condition includes one or more of: an application downloading tool being enabled, an application being enabled, or a synchronization request from a server being received.

7. The computer-implemented method of claim 1, wherein the particular application comprises a pre-configured application, and wherein the pre-configured application comprises at least one of a popular application and a user-configured application.

8. A non-transitory, computer-readable medium storing one or more instructions executable by a computer system to perform operations comprising:

receiving download description information for a particular application from a network using an encrypted communications channel, wherein the download description information includes download address information specifying a network address from which application packages associated with the particular application can be retrieved;

based on the download description information, opening an unencrypted and unencoded communications channel to the specified network address; and downloading an application package associated with the particular application from the network address specified in the download address information, wherein the application package is downloaded using the unencrypted and unencoded communications channel.

9. The non-transitory, computer-readable medium of claim 8, wherein the download description information includes download verification information, and wherein the operations further comprise:

after downloading the application package, verifying the application package according to the download verification information.

10. The non-transitory, computer-readable medium of claim 9, wherein the application package is a first application package, and wherein the operations further comprise:

determining that the verification of the first application package has failed; and in response to determining that the verification of the first application package has failed, downloading a second application package associated with the particular application from the network address specified in the download description information, wherein the second application package is downloaded using an encrypted communications channel.

11. The non-transitory, computer-readable medium of claim 8, wherein receiving the download description information includes retrieving the download description information in response to a download instruction from a user of an application corresponding to the download instruction by using a secure channel.

12. The non-transitory, computer-readable medium of claim 11, the operations further comprising:

locally storing the download description information of the application corresponding to a download condition; and when the download condition is met, downloading the application package associated with the particular application from a network address specified in the locally-stored download address information, wherein the application package is downloaded using an unencrypted and unencoded communications channel.

13. The non-transitory, computer-readable medium of claim 12, wherein the download condition includes one or more of: an application downloading tool being enabled, an application being enabled, or a synchronization request from a server being received.

14. The non-transitory, computer-readable medium of claim 8, wherein the particular application comprises a pre-configured application, and wherein the pre-configured application comprises at least one of a popular application and a user-configured application.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:

receiving download description information for a particular application from a network using an encrypted communications channel, wherein the download description information includes download address information specifying a network address from which application packages associated with the particular application can be retrieved;

based on the download description information, opening an unencrypted and unencoded communications channel to the specified network address; and downloading an application package associated with the particular application from the network address specified in the download address information, wherein the application package is downloaded using the unencrypted and unencoded communications channel.

16. The computer-implemented system of claim 15, wherein the download description information includes download verification information, and wherein the operations further comprise:

after downloading the application package, verifying the application package according to the download verification information.

17. The computer-implemented system of claim 16, wherein the application package is a first application package, and wherein the operations further comprise:

determining that the verification of the first application package has failed; and in response to determining that the verification of the first application package has failed, downloading a second application package associated with the particular application from the network address specified in the download description information, wherein the second application package is downloaded using an encrypted communications channel.

18. The computer-implemented system of claim 15, wherein receiving the download description information includes retrieving the download description information in response to a download instruction from a user of an application corresponding to the download instruction by using a secure channel.

19. The computer-implemented system of claim 18, the operations further comprising:

locally storing the download description information of the application corresponding to a download condition; and when the download condition is met, downloading the application package associated with the particular application from a network address specified in the locally-stored download address information, wherein the application package is downloaded using an unencrypted and unencoded communications channel.

20. The computer-implemented system of claim 19, wherein the download condition includes one or more of: an application downloading tool being enabled, an application being enabled, or a synchronization request from a server being received.

* * * * *